Nov. 6, 1934.      H. W. BELL      1,979,526
SPRING SHACKLE
Filed March 29, 1932    4 Sheets-Sheet 1

INVENTOR
Harvey W. Bell.
BY *Moses & Nolte*
ATTORNEYS

Nov. 6, 1934.   H. W. BELL   1,979,526
SPRING SHACKLE
Filed March 29, 1932    4 Sheets-Sheet 2
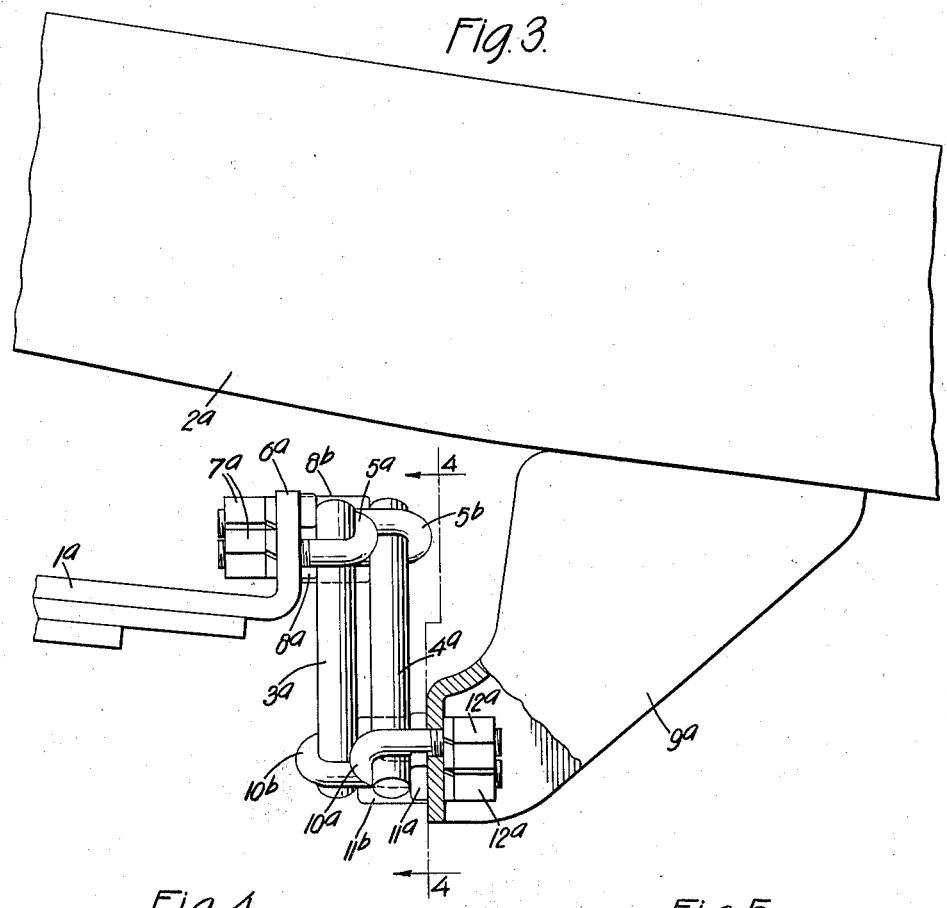
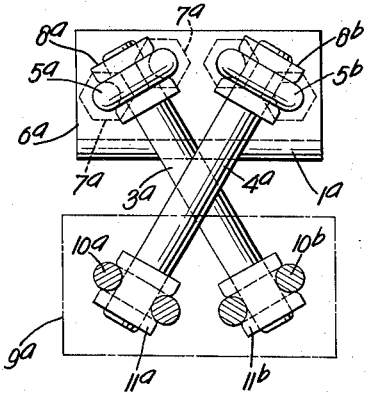
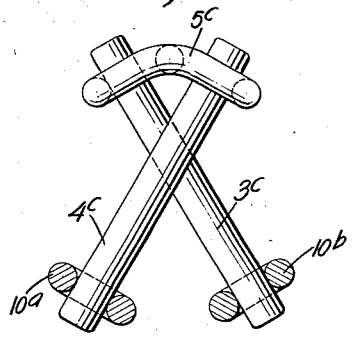
INVENTOR
Harvey W. Bell.
BY *Moses & Nolte.*
ATTORNEYS Nov. 6, 1934.    H. W. BELL    1,979,526
SPRING SHACKLE
Filed March 29, 1932    4 Sheets-Sheet 3
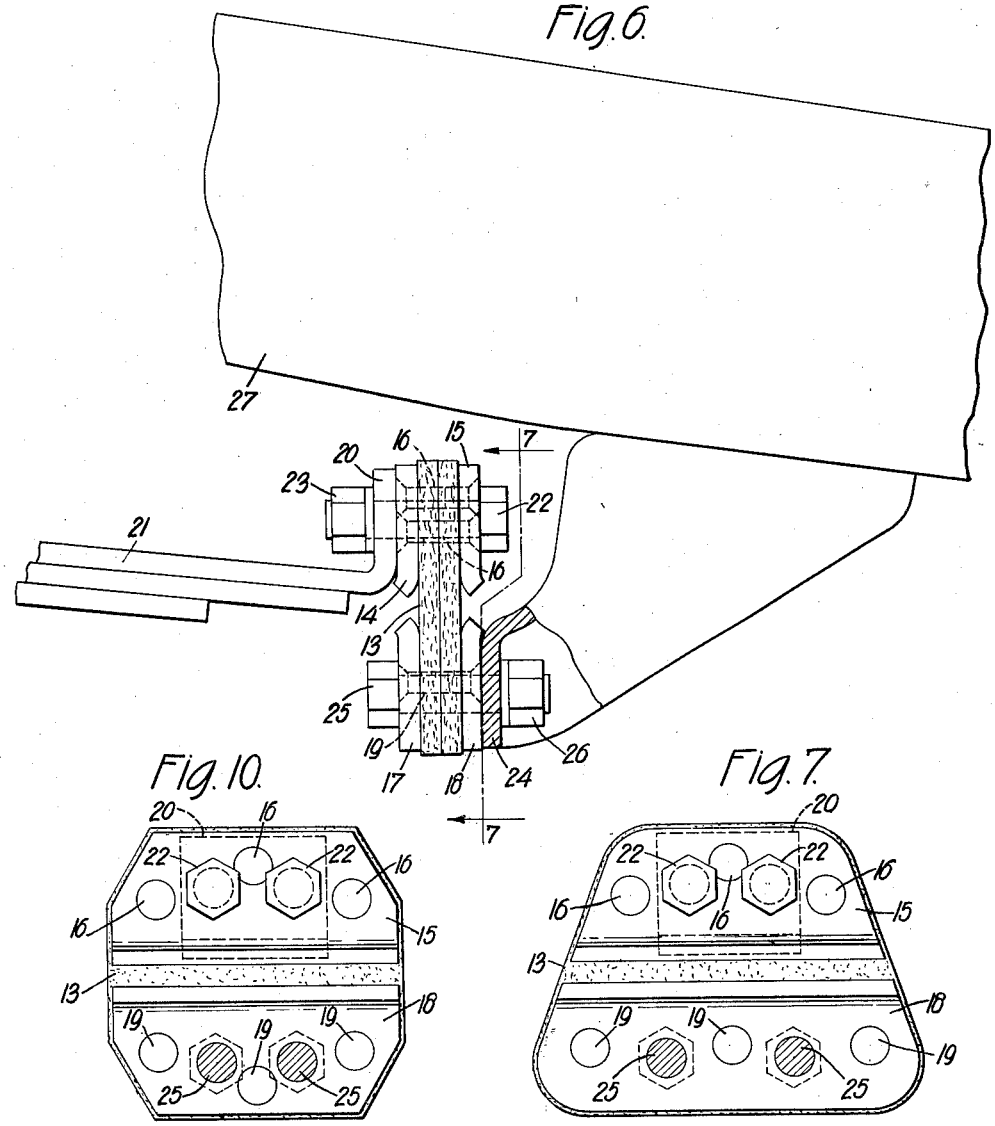
INVENTOR
Harvey W. Bell.
BY Moses & Nolte
ATTORNEYS Nov. 6, 1934.  H. W. BELL  1,979,526
SPRING SHACKLE
Filed March 29, 1932   4 Sheets-Sheet 4
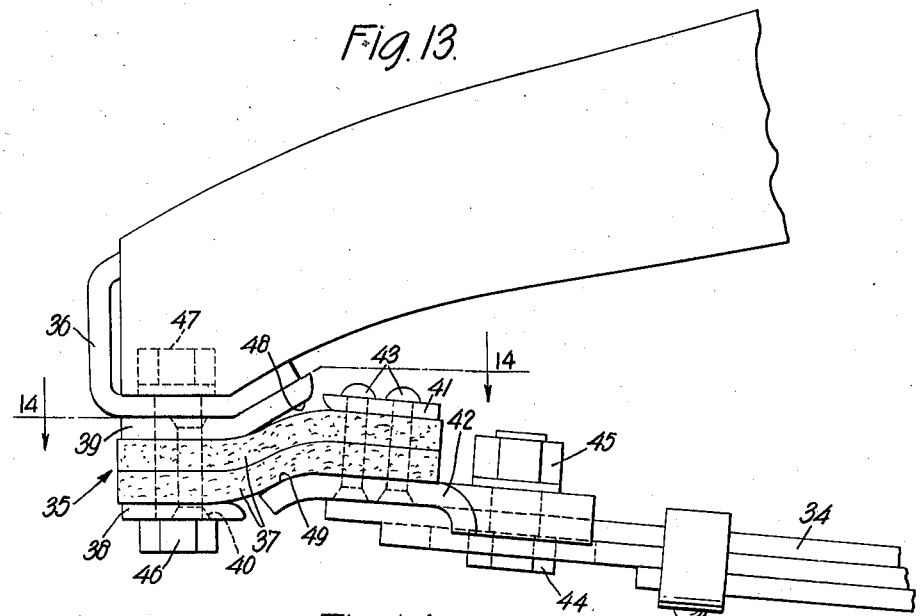
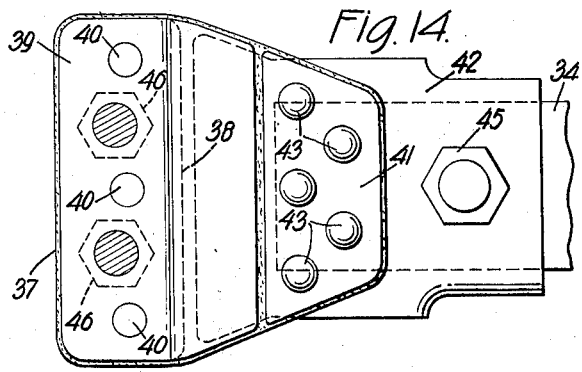
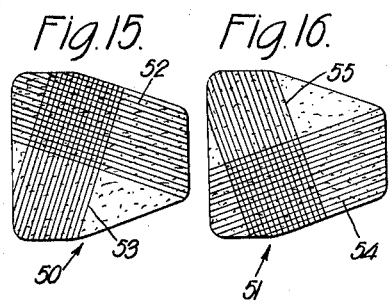
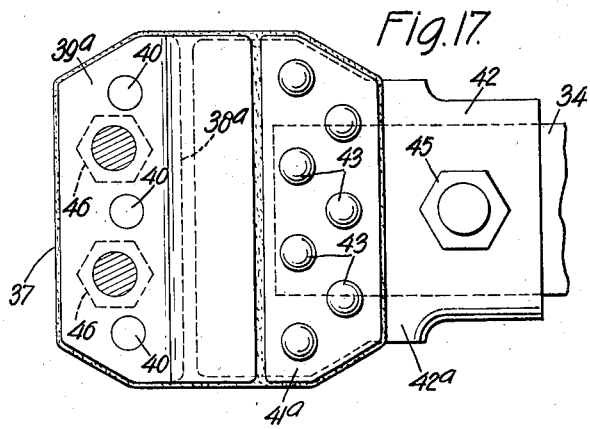
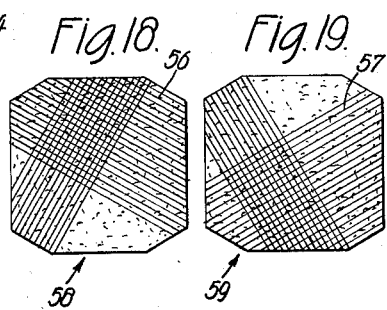
INVENTOR
Harvey W. Bell.
BY Moses & Nolte
ATTORNEYS Patented Nov. 6, 1934

1,979,526

UNITED STATES PATENT OFFICE 1,979,526

SPRING SHACKLE

Harvey W. Bell, Ardsley on Hudson, N. Y., assignor to The Beloyt Corporation, New York, N. Y., a corporation of Delaware Application March 29, 1932, Serial No. 601,730

9 Claims. (Cl. 267—54)

This invention relates to spring shackles for motor vehicles and has for an object to contrive a flexible shackle having no relatively movable parts in bearing engagement with one another and having strands thereof anchored at their opposite ends and arranged to act under tension to oppose relative sidewise movement of the connected spring and body members.

Other objects and advantages will hereinafter appear.

In the drawings forming part of this specification,

Figure 3 is a view similar to Figure 1 illustrating another embodiment of the invention;

Figure 4 is a sectional view taken on the line 4—4 of Figure 3, looking in the direction of the arrows;

Figure 5 is a view similar to Figure 4 illustrating another embodiment of the invention;

Figure 6 is a view similar to Figure 1 illustrating a still further embodiment of the invention;

Figure 7 is a sectional view taken on the line 7—7 of Figure 6, looking in the direction of the arrows;

Figures 8 and 9 illustrate sheets of fabric employed in the shackle of Figure 7;

Figure 10 is a view similar to Figure 7 illustrating another form of shackle which may be substituted in Figure 6;

Figures 11 and 12 are views showing sheets of fabric employed in the shackle of Figure 10;

Figure 13 is a fragmentary side elevation illustrating a further embodiment of the invention;

Figure 14 is a sectional view taken on the line 14—14 of Figure 13, looking in the direction of the arrows;

Figures 15 and 16 are views showing sheets of fabric employed in the shackle of Figures 13 and 14;

Figure 17 is a view similar to Figure 14 illustrating a modified form of shackle which may be employed in a construction like that of Figure 13; and Figures 18 and 19 illustrate sheets of fabric employed in the shackle of Figure 17.

In shackles of the type wherein spring and body members are connected by means sufficiently flexible to accommodate the required relative movement of the connected members without the necessity for employing relatively movable parts in bearing engagement with one another, the forces which tend to produce relative sidewise movement of the spring and body are generally troublesome, either because an undesired freedom of relative sidewise movement must be tolerated or because the connecting means are subjected to excessive and destructive strains by such forces. This difficulty is met in the embodiment of Figures 1 and 2 by providing a connector between the spring and body having a portion of its load supporting strands inclined downward and to the left and a portion of them inclined downward and to the right. With such an arrangement, one or the other of the sets of strands will invariably resist relative sidewise movement of the spring and body by direct tension action.

Figure 1:
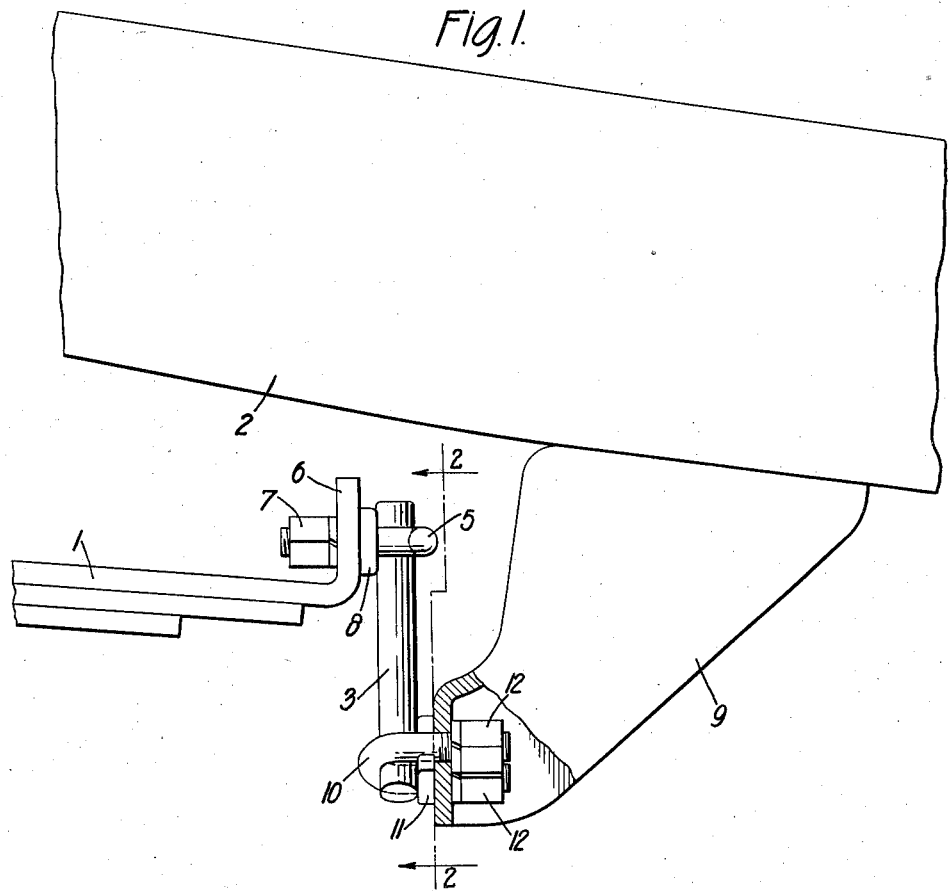
Figure 1 is a side elevation, partly broken away, illustrating a structure embodying features of the present invention.
Figure 2:
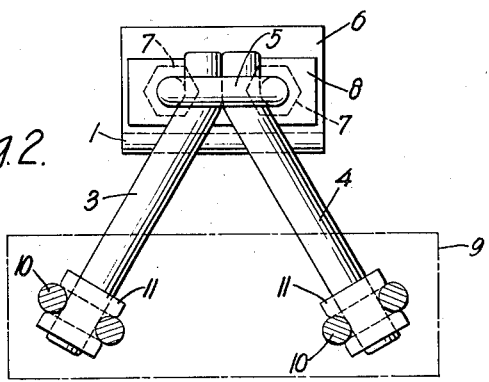
Figure 2 is a sectional elevation taken on the line 2—2 of Figure 1, looking in the direction of the arrows.

In the embodiment of Figures 1 and 2, disclosure is made of a spring 1 and a body member 2 connected to one another through flexible cables 3 and 4. A U-bolt 5 embraces the upper ends of the cables 3 and 4 and has its legs extended through an ear 6 formed on the spring end. Nuts 7 clamp the U-bolt 5 firmly against the cable ends. A clamping plate 8 interposed between the cable ends and the ear 6 cooperates with the body portion of the U-bolt 5 in clamping the cable ends. The cable 3 extends downward and to the left and is clamped at its lower end to a bracket 9 fast on the body member 2. The clamping is effected by means of a U-bolt 10, a clamping plate 11, and nuts 12. The cable 4 extends downward and to the right and is similarly clamped at its lower end to the bracket. It will be seen that the cables 3 and 4 cooperate with one another in supporting the vehicle body from the spring and that normally the load will be substantially equally divided between the cables. When there is a tendency of the body to move outward with relation to the spring, the strands of cable 3 will be subjected to tension, the forces acting in the direction of the length of the cable. The cable 3 is so inclined to the vertical that any movement of the body to the left will necessarily involve a substantial upward movement of the body as well. Hence the tendency of the body to move sidewise will be strongly opposed. From what has been said concerning the action of the cable 3 when the body tends to move to the left, it will be apparent that the cable 4 acts similarly when the body tends to move to the right. The arrangement described is duplicated at the opposite side of the vehicle.

In the embodiment of Figures 3 and 4 the same general principle is utilized but the cables are disposed in crossed relation. A spring 1a is connected to a body member 2a by means of a cable 3a inclined downward and to the left and a cable 4a inclined downward and to the right. The cable 3a is clamped to a spring ear 6a by means of a U-bolt 5a, a clamping plate 8a, and nuts 7a. The upper end of the cable 4a is similarly clamped to the spring ear 6a by a separate U-bolt 5b. A clamping block 8b, substantially thicker than the clamping plate 8a, is interposed between the cable 4a and the ear 6a and acts as a spacer for locating the cable 4a in a different transverse plane from the cable 3a. The lower end of cable 4a is clamped to a body bracket 9a by means of a U-bolt 10a, a clamping plate 11a, and nuts 12a. The lower end of the cable 3a is similarly clamped to the bracket 9a by means of a longer U-bolt 10b. A clamping block 11b is interposed between the cable 3a and the bracket member 9a. This embodiment of the invention acts in the manner already described to support the vehicle body under normal conditions and to resist sidewise movement of the body relative to the spring.

The embodiment of Figure 5 is similar to that of Figure 4. It differs in that the cables 3c and 4c are crossed near the upper ends thereof instead of at the middle and in the fact that the upper ends of the cables 3c and 4c are secured to the spring end by a common double U-bolt 5c.

In the embodiment of Figures 6 to 9, inclusive, the principles of the Figure 1 and 2 embodiment are employed in a shackle formed of flexible fabric links 13. The fabric links 13 are interposed between clamping plates 14 and 15 which are held together by rivets 16, and between clamping plates 17 and 18 which are held together by rivets 19. The upper ends of the links are secured to an ear 20 of a spring 21 by means of bolts 22 and nuts 23. The lower ends of the links are secured to a bracket member 24 by means of bolts 25 and nuts 26. The bracket member 24 is rigidly secured to a body member 27. The links 13 are made up of rubberized fabric sheets 28 and 29, as illustrated in Figures 8 and 9. In the sheets 28 certain of the threads 30, which may be the warp or the woof, extend at an upward and inward inclination and the other threads 31 extend at right angles to the direction of the threads 30. In the sheets 29 certain of the threads 32 extend at an upward and outward inclination while the other threads 33 extend at right angles to them. The sheets 28 and 29 may be alternated or may be combined in any suitable way so as to provide an adequate number of threads 30 for performing substantially the function of the cable 3 of Figures 1 and 2 and an adequate number of threads 32 for performing substantially the same function as cable 4 of Figures 1 and 2. The threads 30 and 32 are of primary importance in that they are clamped at both ends and act under tension to sustain the weight of the body and to resist sidewise movement of the body with relation to the spring. The threads 31 and 33, of course, also perform an important function in stiffening the link in the plane of its body to assist in opposing sidewise movement of the body and in resisting the vertical component which accompanies such movement. It will be seen that the links of Figures 8 and 9 correspond substantially to the arrangement of Figures 1 and 2 in that the links are narrow at the upper ends, so that the threads 30 and 32 do not cross and then continue clear of one another.

In Figures 10, 11 and 12 disclosure is made of a modified form of shackle similar in every way to that of Figures 7 to 9 except that the shackle is broad at its upper end and that the threads 30a and 30b of sheets 28a and 29a do cross and clear one another so as to produce in effect a crossed arrangement like that of Figures 3 and 4. In the embodiment of Figure 13 a spring 34 is connected by means of a shackle 35 to a body bracket 36. The shackle 35 comprises a pair of rubberized fabric links 37 held at their forward ends between clamping plates 38 and 39 by rivets 40, and held at their rear ends between clamping plates 41 and 42 by rivets 43. The rear end of the clamping plate 42 is secured to an end of the spring 34 by means of a bolt 44 and a nut 45. The forward end of the shackle is secured to the body bracket 36 by means of bolts 46 and nuts 47. The clamping plate 39, which is disposed at the upper side of the fabric links 37, has a bearing surface 48 that is inclined upwardly and rearwardly at an angle of about 30° to the horizontal while the clamping plate 42 is provided with an extensive arcuate bearing surface 49 of large radius. The bearing surfaces 48 and 49 transmit the load of the vehicle body through the links 37 in compression but the arrangement is such that the links are normally under longitudinal tension. The sheets 50 and 51, with the exception of a slight difference of shape as shown by the drawings, are the same as the sheets 28 and 29 of Figures 8 and 9. They comprise threads 52 and 53 corresponding respectively to threads 30 and 31, and threads 54 and 55 corresponding respectively to threads 32 and 33. The sets of threads 52 and 54, both of which are clamped at their opposite ends, do not cross and clear one another.

The embodiment of Figures 17 to 19 is a variation of the embodiment of Figures 13 to 16 embodying the features of Figures 11 and 12. The threads 56 and 57 of sheets 58 and 59 are crossed and are clamped at their opposite ends between broad clamping plates 41a, 42a, 39a and 38a.

I have described what I believe to be the preferred embodiments of my invention. I do not wish, however, to be confined to the embodiments shown, but what I desire to cover by Letters Patent is set forth in the appended claims.

I claim:—

1. In a vehicle, the combination with the body and a spring, of a substantially inextensible, flexible tension shackle comprising strands inclined downward and to the left for supporting the body from the spring under tension and for resisting movement of the body toward the left with relation to the spring, and strands inclined downward and to the right for supporting the body from the spring under tension and for resisting movement of the body to the right with relation to the spring, and means securing the upper ends of said strands to the spring and the lower ends of said strands to the body.

2. In a vehicle, the combination with the body and a spring, of a substantially inextensible, flexible tension shackle comprising fabric sheets, certain of said sheets having threads inclined downward and to the left for supporting the body from the spring under tension and for resisting movement of the body toward the left with relation to the spring, and others of the sheets having threads inclined downward and to the right for supporting the body from the spring under tension and for resisting movement of the body toward the right with relation to the spring, and means securing the upper ends of said strands to the spring and the lower ends of said strands to the body.

3. A trapezoidal fabric shackle link composed of a plurality of juxtaposed sheets of substantially inextensible material, certain of said sheets having threads that extend substantially throughout the height of the trapezoid and substantially parallel to one of the legs thereof, and others of said sheets having threads that extend substantially throughout the height of the trapezoid and substantially parallel to the other leg thereof.

4. A trapezoidal fabric shackle link of substantially inextensible material having threads that extend substantially throughout the height of the trapezoid and substantially parallel to one of the legs thereof, and other threads that extend substantially throughout the height of the trapezoid and substantially parallel to the other leg thereof.

5. A fabric shackle link composed of a plurality of juxtaposed sheets of substantially inextensible material, and having the opposite ends thereof substantially parallel, certain of said sheets having threads that extend from end to end thereof and form acute angles with the end edges, and others of the sheets having threads that extend from end to end thereof and form opposite acute angles with the end edges.

6. A substantially inextensible fabric shackle link having the opposite ends thereof substantially parallel, and having threads that extend from end to end thereof and form acute angles with the end edges, and other threads that extend from end to end thereof and form opposite acute angles with the end edges.

7. In a shackle, connecting means consisting of a plurality of layers of rubberized fabric material having the strands of the layers in parallel planes, clamping members for fixedly connecting opposite ends of said material to the spring and frame of a vehicle so that the weight of the sprung portion of the vehicle places said material under tension, certain of the strands of said material being clamped at each end and inclined to the normal direction of tension in said material.

8. In a shackle, connecting means consisting of a plurality of layers of rubberized fabric material having the strands of the layers in parallel planes, clamping members for fixedly connecting opposite ends of said material to the spring and frame of a vehicle so that the weight of the sprung portion of the vehicle places said material under tension, certain of the strands of said material being clamped at each end and inclined to the normal direction of tension in said material, certain of said strands being inclined in one direction and others in the opposite direction.

9. In a shackle, connecting means consisting of a plurality of layers of rubberized fabric material having the strands of the layers in parallel planes, clamping members for fixedly connecting opposite ends of said material to the spring and frame of a vehicle so that the weight of the sprung portion of the vehicle places said material under tension, certain of the strands of said material being clamped at each end and inclined to the normal direction of tension in said material, the said layers of rubberized fabric material being assembled into a plurality of separate slabs, the said strands of one of said slabs being inclined in one direction and the said strands of another of said slabs being inclined in the opposite direction.

HARVEY W. BELL.